Figure 1:
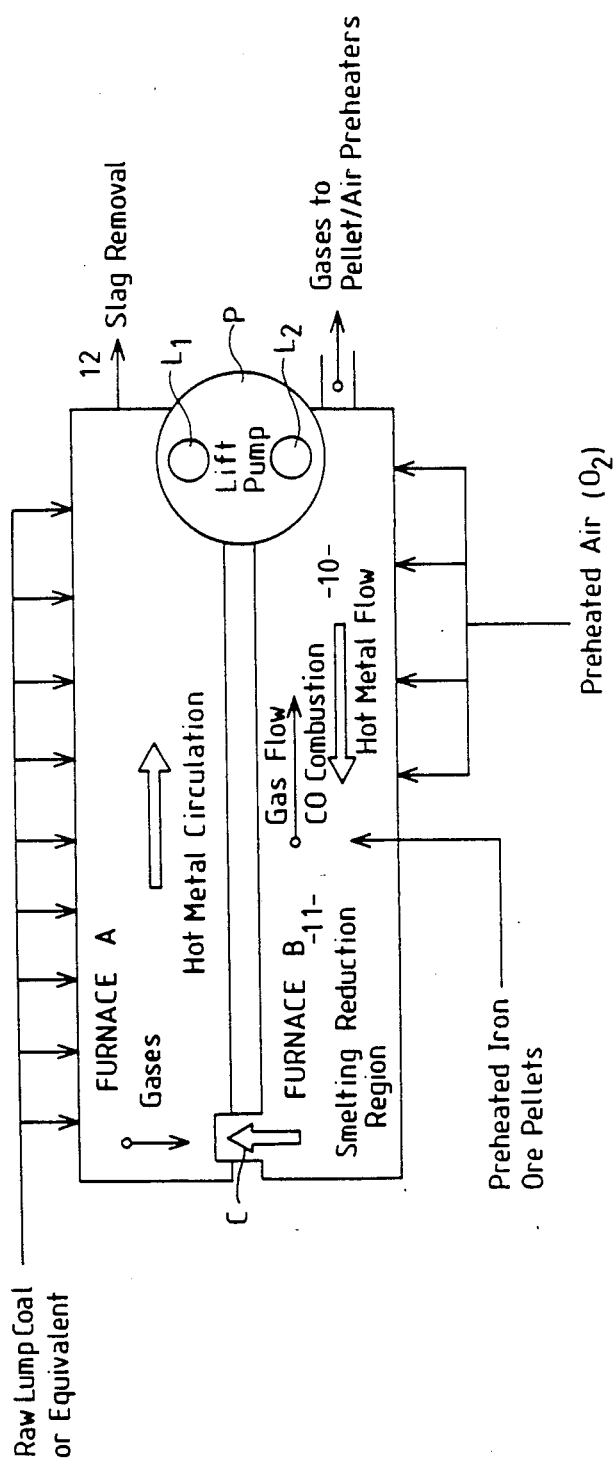

United States Patent [19]

Warner

[11] Patent Number: 4,701,217

[45] Date of Patent: Oct. 20, 1987

[54] SMELTING REDUCTION

[75] Inventor: Noel A. Warner, Rednal, England

[73] Assignee: University of Birmingham, Birmingham, England

[21] Appl. No.: 927,548

[22] Filed: Nov. 6, 1986

[51] Int. Cl.[4] ............................................. C22B 5/02
[52] U.S. Cl. .................................... 75/92; 75/21; 75/29; 75/82
[58] Field of Search .................... 75/21, 29, 65 R, 80, 75/82, 92

[56] References Cited

U.S. PATENT DOCUMENTS 3,326,671 6/1967 Worner ................................. 75/92
3,955,970 5/1976 Claxton ............................. 75/65 R Primary Examiner—Peter D. Rosenberg
Attorney, Agent, or Firm—Holman & Stern

[57] ABSTRACT

Smelting reduction of metallic oxide material, e.g. pelletized iron oxide ore or iron oxide ore fines is effected by contacting such material with a circulating molten carrier material, e.g. molten iron in the case of iron oxide smelting, in a furnace, and by introducing a carbonaceous reductant e.g. coal into the carrier material. The reductant converts the metal oxide to metal in a smelting reduction zone. Carbon monoxide thereby produced is combusted in a heating zone through which the carrier material passes to effect heat recovery. Slag is removed from the carrier material surface before entering the heating zone. A protective layer of molten material, e.g. lead, which is substantially stationary is maintained below the circulating carrier material to inhibit erosion of the furnace hearth.

In other processes, deepsea manganese nodules are conjointly smelted with chalcopyrite in a circulating molten Cu-Ni-Co matte carrier while maintaining a protective layer of Cu-Ni-Co alloy below the matte; and high silica nickel laterite and limonitic ores are conjointly metallized and sulphided while being supported by a circulating molten nickel matte carrier, with controlled addition of carbon to cause a protective layer of ferronickel alloy containing carbon to be maintained below the matte carrier.

22 Claims, 9 Drawing Figures

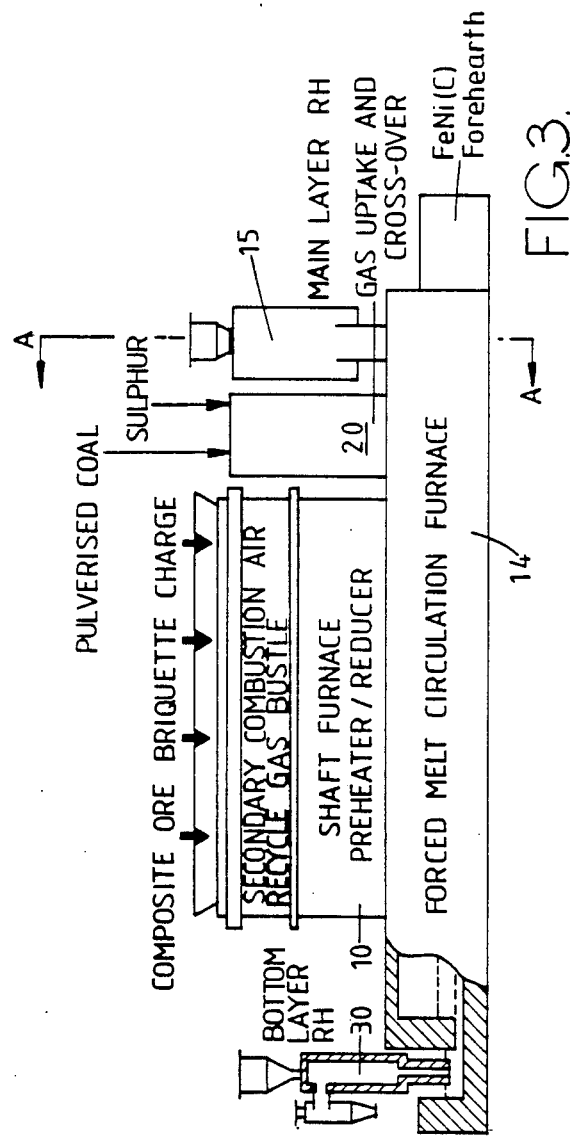
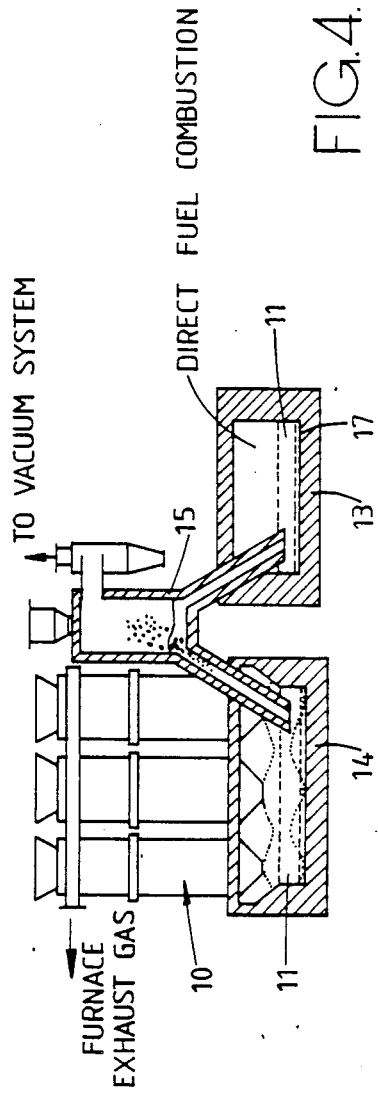
FIG.3.
FIG.4.

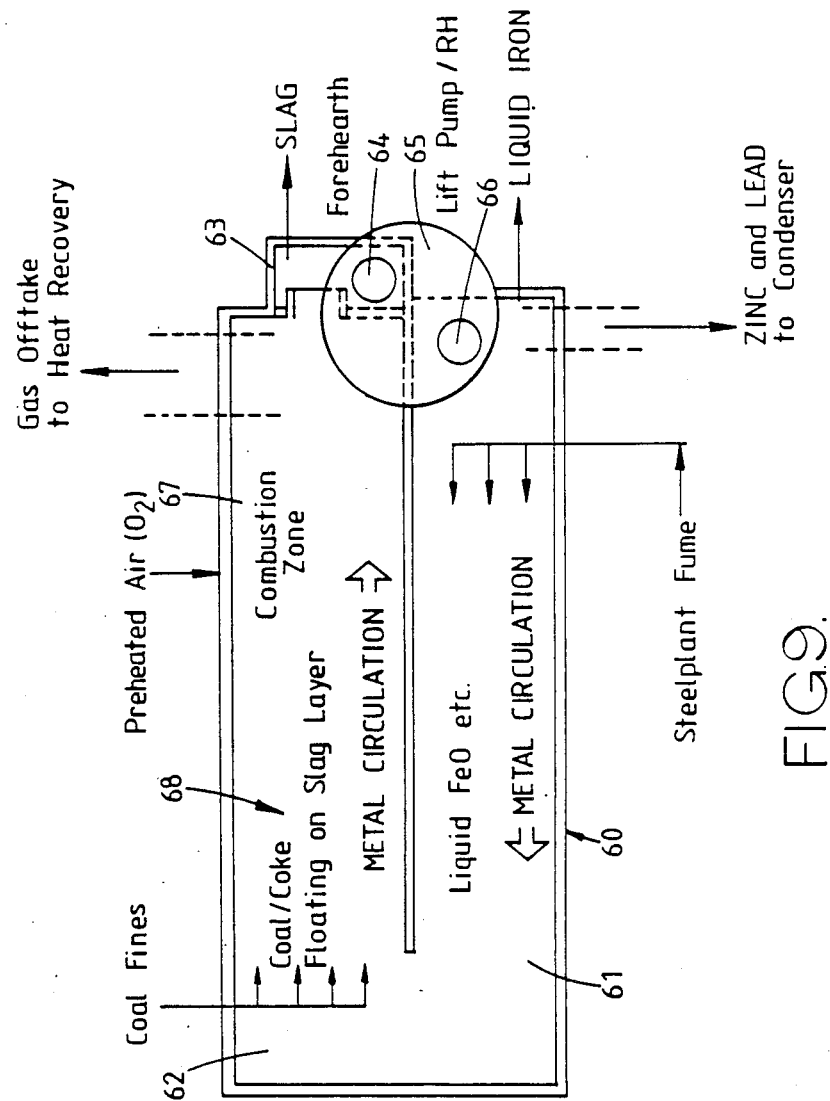

SMELTING REDUCTION

This invention relates to smelting reduction of metal oxide materials, for example, iron oxide ores, such as haematite, metal oxide ores, e.g. nickel laterite ores, and deepsea manganese nodules, for the purpose of recovering metallic valuables therefrom. The present invention is also concerned with the treatment of steelplant fume and other in-plant fines for the purpose of recovering valuables therefrom.

A method for the recovery of non-ferrous metals from their sulphide ores is disclosed in European Patent Application 0016595 (also British Patent 2048309 and U.S. Pat. No. 4,334,918), in which a molten sulphide carrier is forcibly circulated through an extraction circuit and sulphide ore is introduced into the molten sulphide carrier composition at an ore receiving station so that the ore is dissolved in or smelted by the composition, and the molten carrier composition containing the ore is contacted with oxygen at an oxidation station so as to oxidise at least part of the ore and/or the molten carrier composition. At the oxidation station, the sulphide ore is converted to the non-ferrous metal to be extracted or a further sulphide in the composition or the ore is converted to a material capable, directly or after further processing, of reducing the sulphide ore to produce the non-ferrous metal to be extracted. The heat generated during the oxidation step is recovered by the molten carrier composition and is transmitted thereby to endothermic sites in the circuit. In such process, there is also described the possibility of recovering non-ferrous metals from non-ferrous metal sulphide ores which contain iron oxide and iron sulphide. In such a case, the iron sulphide is converted to iron oxide in the oxidation station, the iron oxide, and the thus formed iron oxide together with the iron oxide in the feed is reduced to metallic iron by addition of a reducing agent such as coal or coal char in order to reactivate the oxidised sulphide carrier composition. The metallic iron is subsequently reacted with non-ferrous metal sulphide introduced into the carrier composition to produce iron sulphide and the non-ferrous metal which is subsequently recovered.

Further details of sulphide ore smelting by the above-mentioned melt circulation method are disclosed in "Direct smelting of zinc-lead ore" by N.A. Warner, Trans. Instn Min. Metall. (Sect. C; Mineral Process. Extr. Metall.), 92, Sept. 1983; C147–152; "Integration of tin volatilisation with direct ore smelting." by N.A. Warner, Extraction Metallurgy '85; and "Towards Polymetallic Sulfide Smelting" by N.A. Warner, International Symposium on Complex Sulfides. TMS-AIME, San Diego, U.S.A, Nov. 10–13 1985.

It has now been discovered that the use of a circulating molten carrier can be advantageous in the smelting reduction of certain metal oxides to recover metals therefrom.

According to a first aspect of the present invention, there is provided a method of smelting metal oxide material comprising the steps of circulating molten carrier material in a closed loop path through a smelting reduction zone and a heating zone; contacting the metal oxide material with the molten carrier material; introducing a carbonaceous reductant into the molten carrier material; at least partially reducing said metal oxide to metal by the carbonaceous reductant, the metal oxide and carbonaceous reductant being utilised in proportions such that the carbon from the carbonaceous reductant is converted to carbon monoxide; reacting the carbon monoxide with oxygen in the heating zone at the surface of the molten carrier material so that heat generated by the reaction is transferred to the molten carrier material which is circulated to the smelting reduction zone; removing slag from said molten carrier material before the latter is circulated to the heating zone; and recovering said metal.

The carbonaceous reductant (e.g. coal and/or coke) may be introduced into the circulating molten carrier material after leaving the smelting reduction zone but before entering the heating zone so that combustible gases generated as a result of heating of the reductant can be used to heat the molten metal in the heating zone.

The method of this aspect of the present invention is suitable for the smelting reduction of iron oxide e.g. iron oxide ores such as haematite, using hot metal molten iron (impure in the as-smelted state) as the molten carrier material. Thus, the iron produced by smelting reduction of the iron oxide forms the carrier material which is removed, preferably continuously, at a rate which substantially balances the rate of iron production.

As defined by Eketorp and co-workers (Scandinavian Journal of Metallurgy) 3(1974) 200-204) smelting reduction is different from the classical blast furnace method in that reduction of iron oxide at high temperature is carried out by reaction with carbon to CO only. The CO formed is burnt to $CO_2$ with air or oxygen close to the site of reduction and the heat generated is used for compensation of the strongly endothermic reduction reaction. As pointed out by Eketorp, smelting reduction processes have been tried in the past but so far the difficult problem of heating a reducing bed or bath without at the same time oxidising it, has not been solved technically despite the considerable energy and capital cost advantages that would accrue.

The method of the present invention is usually performed with a very large proportion of molten carrier material circulation to molten metal produced. For example, in the case where the metal oxide is iron oxide, a circulation ratio of 100:1 to 300:1 can be employed, the actual ratio depending upon the nature of the feed and the energy requirements thereof. In a particular example, a circulation ratio of 288:1 is employed, namely for every unit of iron produced, 288 units of molten iron as carrier are circulated between the smelting reduction zone and the heating zone in the closed loop path. The rate of circulation depends upon the size of the equipment and the required smelting rate. However, in the case where the molten carrier material is capable of dissolving carbon (e.g. where the molten carrier material is molten iron), it may be preferred to contact the molten carrier material with carbonaceous material before the smelting reduction zone so that the molten carrier material which is circulated to the smelting reduction zone includes dissolved carbon. This enhances the reduction reaction with the metal oxide. For iron oxide smelting, the dissolved carbon content of the molten iron carrier typically amounts to about 3% by weight.

The metal oxide material may be in the form of an agglomerate, e.g. in pelletised or briquetted form, and may be introduced onto the surface of the molten carrier material in the smelting reduction zone. The metal oxide thus introduced is subjected to smelting reduction to produce the metal and carbon monoxide which rises to the surface of the molten carrier material and is passed, usually in countercurrent fashion relative to the carrier flow, to the heating zone where it is combusted to produce carbon dioxide.

The temperature of the molten carrier material depends upon the type of metal oxide being smelted, and is chosen so as to ensure that all phases present are prevented from solidifying. For iron oxide ore smelting, the temperature is typically 1300° C. to 1550° C.

The proportions of metal oxide to carbonaceous reductant depend again upon the metal oxide being smelted and also upon the nature of the carbonaceous reductant. However, the proportions employed will be such as to give carbon monoxide. Thus, it will be usual to operate the process with a stoichiometric excess of carbon relative to the amount of oxide to be reduced in the smelting reduction zone.

A preferred way of dissolving or dispersing carbon in the molten carrier material is to cause the molten carrier material to flow at high velocity past carbonaceous material. This can be effected by maintaining a restricted clearance between the bottom of a mass of carbonaceous material and the bottom of a vessel through which the molten carrier material circulates.

In order to maximise the efficiency of heating of the molten carrier material in the heating zone, it is necessary to prevent accumulation of slag in the heating zone. This can conveniently be effected by removing the molten carrier layer from under the slag layer and passing it to the heating zone.

In a particular example, the molten carrier material is circulated around a closed loop wherein the heating zone and the smelting reduction zone are at a level such that the surface of the molten carrier material therein is higher than the surface of the molten carrier material at a region where slag is removed. This can be effected conveniently by providing said reducing and heating zones in one furnace and circulating the carrier material through such furnace and another furnace which is lower than the first furnace and in which slag removal takes place.

The method according to said first aspect of the present invention is preferably effected whilst maintaining a stationary or only relatively slowly moving layer of protective, molten material under the circulating molten carrier material so as to protect the hearth(s) of vessel(s) in which circulation of molten carrier material takes place, said protective molten material being denser than, and immiscible with, said circulating molten carrier material. This procedure will be discussed hereinafter in greater detail in relation to a second aspect of the present invention.

Figure 2:
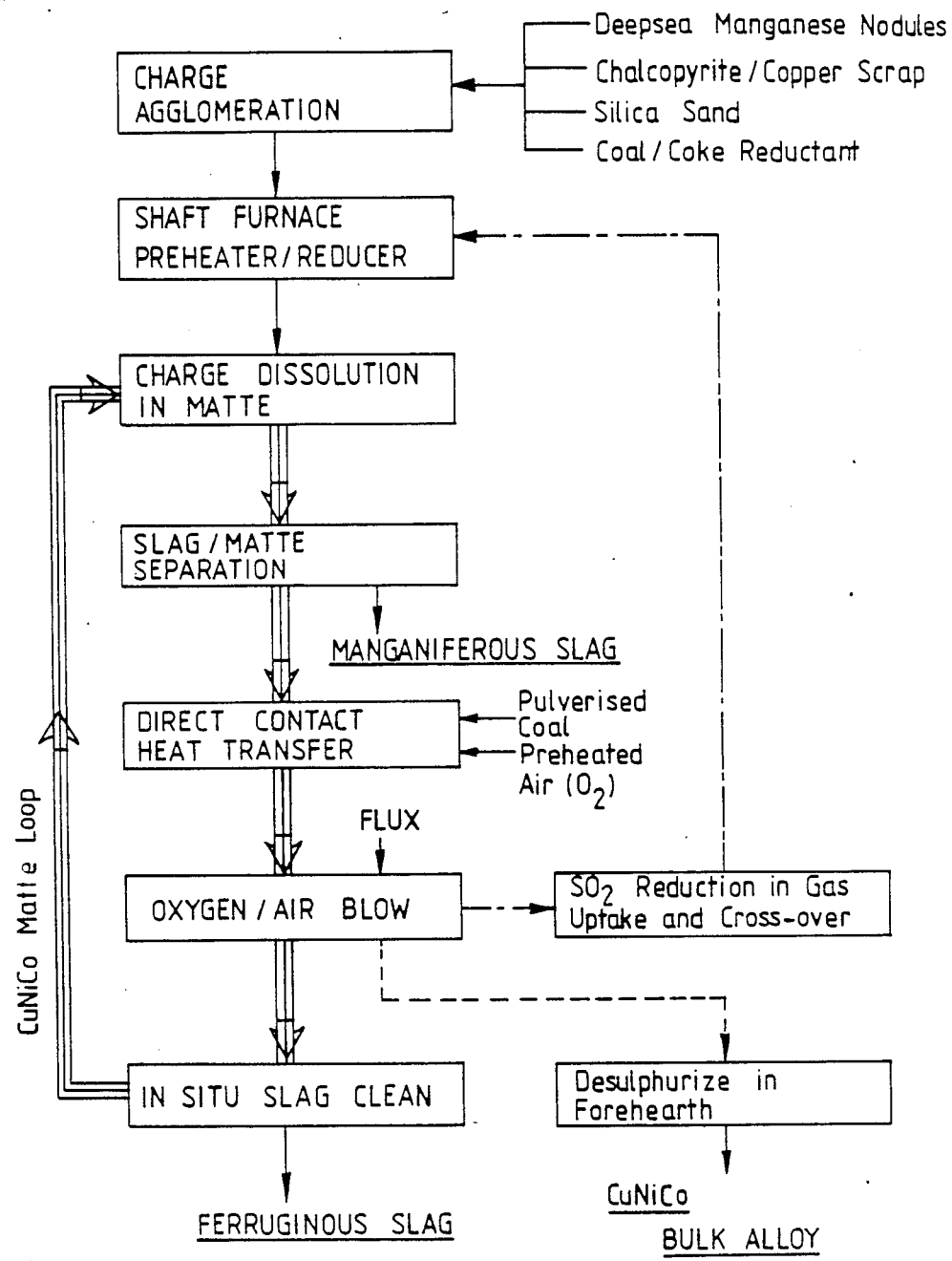
Figure 5:
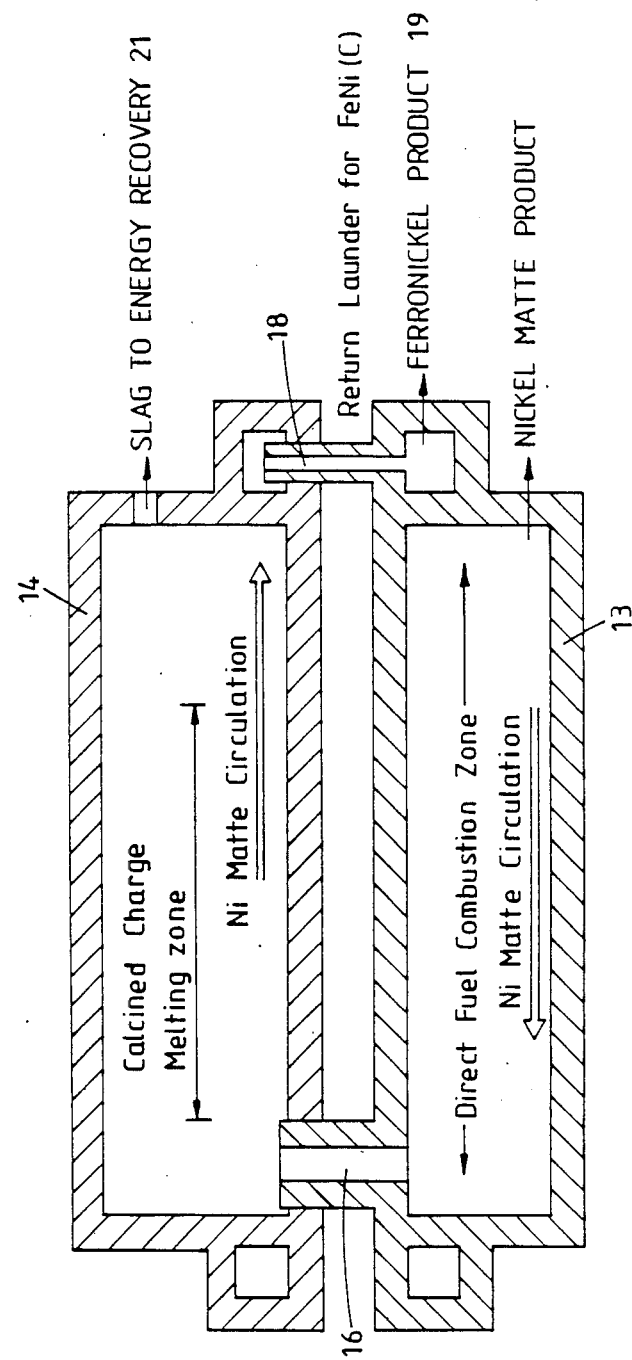
Figure 7:
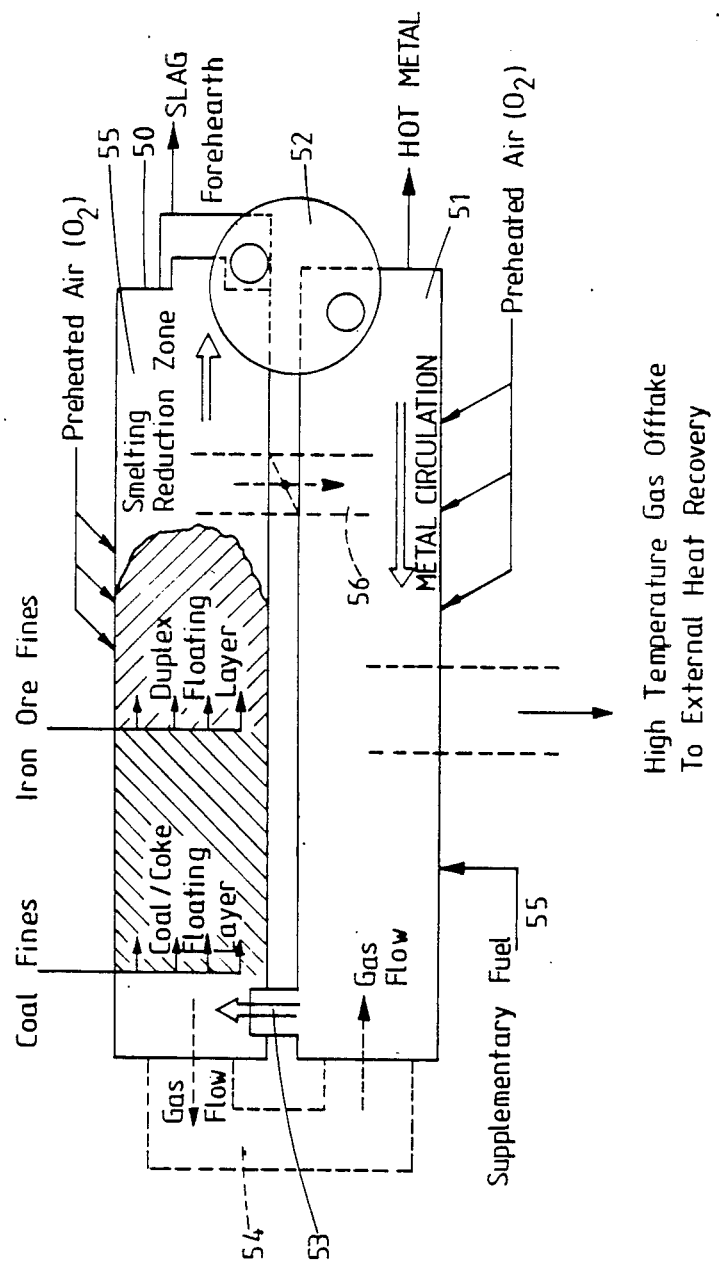
Figure 8:
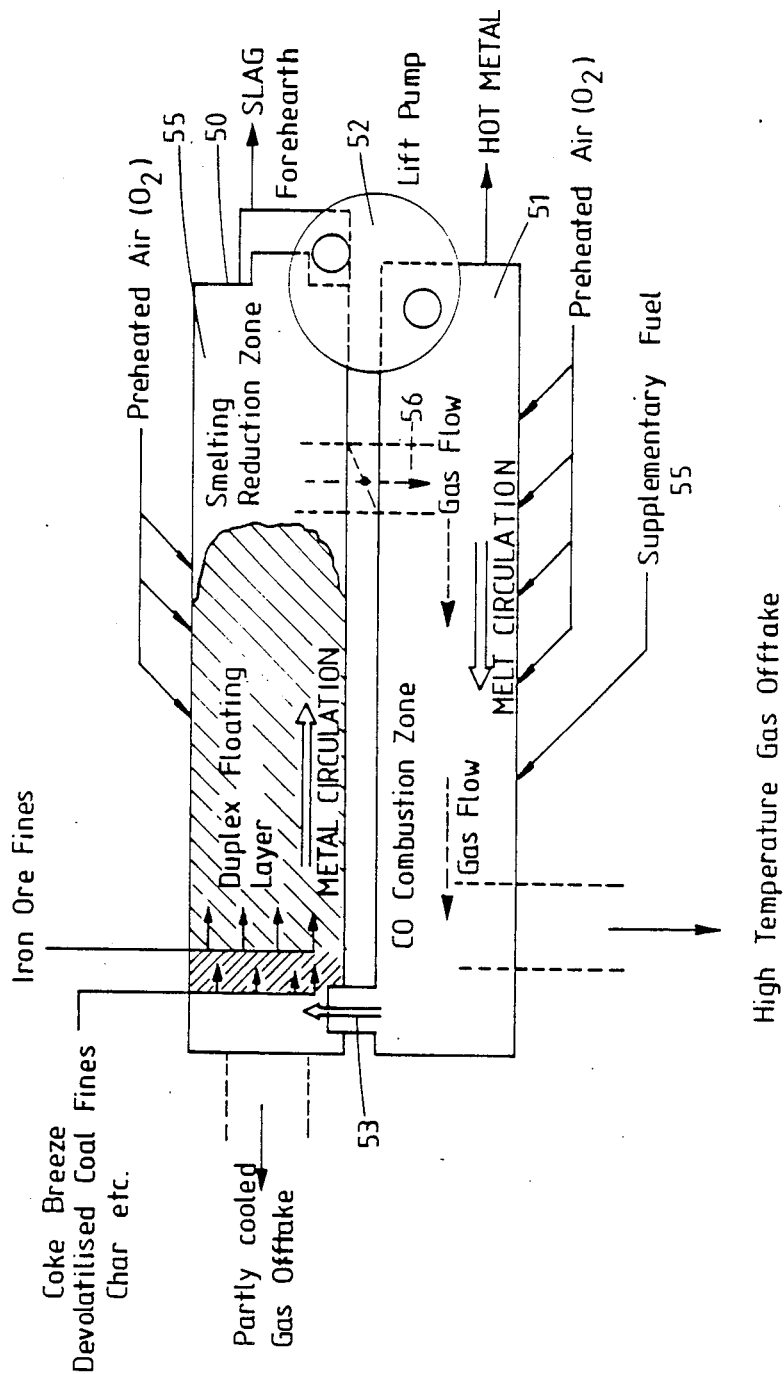

A particular example of this aspect of the invention as applied to iron oxide smelting will now be described with reference to FIG. 1 of the accompanying drawings, in which:

FIG. 1 is a schematic general arrangement, in plan view, of a plant for the smelting reduction of iron oxide ore, FIG. 2 is a block diagram of a general arrangement of plant for the smelting reduction of deepsea manganese nodules and chalcopyrite, FIG. 3 is a schematic general arrangement, in side elevation, of a plant for the smelting of a composite charge of high silica nickel laterite and limonitic ores, FIG. 4 is a section on the line A—A of FIG. 3, FIG. 5 is a plan view of the plant of FIGS. 3 and 4, FIG. 5 is a sectional view through the plant of FIG. 3 showing the shaft furnace in elevation, FIG. 7 is a schematic general arrangement, in plan view, of a plant for the smelting reduction of iron ore fines using coal fires, FIG. 8 is a schematic general arrangement, in plan view, of a plant for the smelting reduction of iron ore fines using coke breeze, devolatilised coal fines, char etc, and FIG. 9 is a schematic general arrangement, in plan view, of a plant for the smelting reduction of steelplant fume using coal fines.

Referring now to FIG. 1, the plant comprises a pair of side-by-side furnaces A and B. The hearth of furnace A is lower than the hearth of furnace B. At the left hand end of the furnaces A and B as viewed in FIG. 1, a channel C is provided to permit melt flow from furnace B to furnace A. At the opposite end of the furnaces A and B, a lift pump P is provided which operates on the RH vacuum degassing principle in that a reduced pressure is maintained in a reservoir above legs $L_1$ and $L_2$ of the pump to effect forced circulation of hot metal (i.e. molten iron which is the direct product of the smelting reduction of iron oxide ore and which therefore contains minor amounts of the usual incidental ingredients C, Si, Mn, S etc) in a closed loop path. Hereinafter such hot metal will be referred to simply as molten iron to distinguish it clearly from the molten lead layer described below. A pool of molten lead is provided over the hearths of the furnaces A and B to a depth of 40–100 mm. The molten iron is provided as a 200–500 mm thick layer above the pool of liquid lead.

The legs $L_1$ and $L_2$ extend into the layer of molten iron in the respective furnaces A and B. When the lift pump P is operated, molten iron is drawn up leg $L_1$ from furnace A and discharged through leg $L_2$ into furnace B. At the opposite end of furnace B to lift pump P, molten iron flows through the channel C into furnace A. Thus, a closed loop path of molten iron which circulates in a clockwise direction, as indicated by larger arrows in FIG. 1, is provided. Raw lump coal or the like is supplied as a layer which rests on the upper surface of the molten iron in furnace A. The raw lump coal contacts the surface of the iron over the majority of the length of furnace A. Contact of the coal with the molten iron causes carbon to be dissolved in the iron and for the coal to be gasified. The flow rate of molten iron and the area of contact between the coal and the molten iron are chosen so as to produce a dissolved carbon content of about 3% in the molten iron.

As a result of intense heating of the coal in furnace A, coal carbonisation occurs and the coal volatiles thereby produced are passed in countercurrent fashion relative to the flow of molten iron into the left hand end of furnace B through channel C above the molten iron layer. From the left hand end of furnace B, the gases pass to the right hand end of furnace B where a heating zone 10 is provided. The heating zone 10 is supplied with pre-heated air or oxygen to cause combustion of the combustible gases and also combustion of carbon monoxide which is supplied as described hereinafter. The heat of combustion is transferred to the molten iron to raise the temperature thereof. The molten iron which is circulated from the heating zone 10 enters a smelting reduction zone 11 in the furnace B. Pre-heated iron ore pellets are supplied to the surface of the molten iron in the smelting reduction zone 11 and are reduced by the carbon in the iron to convert the iron oxide to iron and simultaneously oxidise the carbon to carbon monoxide which is passed in the direction of the smaller arrow to the heating zone 10 for combustion with the pre-heated air or oxygen. Hot combustion gases which leave the heating zone 10 are employed for iron ore pellet and air pre-heating. Any slag which is formed in furnace B is carried by the molten iron over into the lower furnace A and removed together with any raw lump coal residues following carbonisation and carbon dissolution via slag overflow 12. In this way, lift pump P removes the molten iron fromunder the slag and passes it to the heating zone 10 so that a relatively clean molten iron surface is available for efficient heat transfer from the combustion of gases effected therein. The iron oxide pellets fed to the smelting reduction zone 11 are prepared with sufficient limestone addition to flux the gangue in the ore as well as the ash in the coal so that a single slag with a low iron oxide content is removed after contacting the full length of the layer of coal in furnace A. This ensures high iron recovery. It is envisaged that the above described plant could sustain 1000 tpd Fe production if furnace A had a size of 35 m length × 10 m wide so that the layer of coal in contact with the molten iron is about 200 m². Furnace B needs to be about 24 m long to effect carbon monoxide and coal volatile combustion based on an energy intensity of 300 kW/m². This is considered to be possible because only a very thin layer of slag is present on the molten iron in the heating zone 10. To produce the required dissolution of carbon from the raw lump coal or the like, it is considered to be possible to operate with a flow channel width of 6 m in furnace A, a clearance of 0.1 m between the layer of coal and the hearth of furnace A, with a local melt velocity of 1 m/s.

Using pre-heated air for combustion without oxygen enrichment gives a gas-diffusion limited rate of slag formation in furnace B of around 2T/h which at the molten iron circulation rates envisaged will yield a maximum thickness of mobile slag less than 0.5 mm thick. The thermal resistance of the thin slag layer moved continuously to a slag reservoir after overflowing from furnace B is equivalent to a temperature drop across the slag layer of less than 100° C. for an energy transfer rate of say 400 KW/m². The theoretical energy requirement is about 0.45 tonne carbon equivalent per one tonne molten metal containing 4% carbon. This is without oxygen enrichment of the combustion air. The sensible heat of the combustion gases leaving furnace B roughly balances the thermal demand for pre-heating combustion air to 1000 K, without any electricity generation via a waste heat boiler. With oxygen fuel combustion, the theoretical energy requirement is equivalent to approximately 0.4 tonne carbon per one tonne metal containing 4% carbon. The installed electricity generation capacity to match the waste heat boiler would be approximately 200 kWh/tonne molten metal. If 100% oxygen rather than pre-heated air is used, the electrical energy requirements just balance that available from the waste heat boiler system and for 1000 tpd Fe, around 600 tpd oxygen would be required. Heat recovery from the slag may be effected by dry granulation followed by contacting with a carrier gas to recover the sensible and latent heat for use in charge preheating or electricity generation.

To simulate one of the key steps in the above outlined process, the following laboratory tests were undertaken. Cylindrical compacts of fine high-grade hematite ore (about 66% total Fe) and pulverised coal (Ash=3.7%; volatile matter=34.3%; and gross C.V. adiabatic=34.2 MJ kg-l) were prepared using a hydraulic press. At 26% coal and 74% hematite this corresponds to 0.49 tonne coal per 1 tonne contained iron. The green compacts were hardened or semi-coked by immersing in molten lead at 380° C. for 30 minutes and then cooled in nitrogen. Single pellets were then charged into a sealed apparatus vented through a gas meter to ensure the rate of reduction occurring when the composite pellets were immersed in a liquid metal heat transfer medium (molten lead for experimental convenience). Testwork indicated that submergence of initially cold pellets under lead at 1300° C. gave extremely rapid rates of reduction. Immersion in liquid metal at a given temperature gave reduction rates at least three times faster than that observed when a composite pellet is heated in a nitrogen gas stream inside a tube furnace. Pellet metallisations as measured by the bromine methanol dissolution technique were generally 85-90% in a two minute contact. Clearly if the pellets were immersed in hot metal (containing dissolved carbon) even faster reaction rates could be expected. Below 900° C. very little reaction occurred during a 2 minute immersion, whilst at 950° C., 1010° C. and 1200° C. the metallisations achieved were 4%, 32% and 66%, respectively. At 1300° C. the 85-90% metallisation achieved whilst submerged in liquid metal for 2 minutes reflected reduction rates as indicated by rates of gas evolution which were essentially constant after an initial rise over the first minute. The progress of a typical run involving submergence of a 3.2 g composite pellet in molten lead is shown in Table I.

TABLE I

| Time interval (sec) | 0-15 | 15-30 | 30-45 | 45-60 | 60-75 | 75-90 | 90-105 | 105-120 |
|---|---|---|---|---|---|---|---|---|
| Gas evolved (ft³) | 0.12 | 0.23 | 0.25 | 0.28 | 0.30 | 0.29 | 0.30 | 0.30 |
| Melt temp. (°C.) | 1230 | 1280 | 1300 | 1300 | 1290 | 1280 | 1260 | 1260 |

An alternative strategy to smelting reduction employing composite coal/ore agglomerates is to react iron oxide pellets with carbon dissolved in molten iron as proposed above. The kinetics and mechanism of the reduction of solid iron oxides in iron-carbon melts at temperatures in the range 1200°-1500° C. have been studied by D. R. MacRae (Journal of Metals December 1965 and AIME Annual Meeting, New York City 1966) and from this work it is immediately apparent that total reduction of pellets at temperatures around 1450° C. takes a matter of seconds. For freely floating pellets of average weight 3 g reduction to metallic iron is completed in around 30 seconds whereas pellets submerged in carbon saturated iron at the same temperature are fully reduced in about 15 seconds. Process engineering evaluation of a smelting reduction based on this approach indicates that it is not the actual iron oxide reduction reaction itself that is likely to dictate reactor size, but rather dissolution of carbon into the iron melt exerts a much more significant influence. This is particularly the case if one attempts to use raw lump coal as the source of carbon. Forced melt circulation provides the solution to this problem.

The method according to said first aspect of the present invention is not solely applicable to iron oxide ores such as haematite, but is also applicable to the treatment of steel plant fume for the purpose of recovery therefrom of iron and other non-ferrous metals such as zinc and lead which are commonly present in the form of their oxides in steel plant fume. This procedure will be discussed hereinafter in greater detail.

The method of the invention is also applicable to the smelting reduction of the following:

(1) Ilmenite to form titaniferous slag (a source of synthetic rutile) and pig iron.
(2) Chrome ores to form ferrochromium alloys.
(3) Aluminous clays to form aluminium-silicon-iron in the carbothermic or non-electrolytic route to aluminium.
(4) Tin concentrates containing cassiterite to form tin.
(5) Nickel laterites to form ferronickel directly.
(6) Deepsea manganese nodules to form copper-nickel-iron alloy (furnace alloy)
(7) Manganese ores to form ferromanganese alloys.

It has been discovered that severe erosion of the linings of the furnace or furnaces in which forced circulation of molten carrier material takes place can occur as a result of passage of the molten carrier material thereover at the high rates necessary for efficient smelting and heat recovery. Whilst replacement of the refractory linings at the sides of such furnaces is possible without completely closing down the plant, it is difficult if not impossible to replace the refractory lining at the hearth of such furnace or furnaces.

It is therefore an object of a second aspect of the present invention to obviate or mitigate such disadvantages.

According to such second aspect of the present invention, there is provided a method of smelting metal oxide material for the purpose of recovering metal therefrom, comprising the steps of forcibly circulating a molten carrier material through an extraction circuit; contacting said metal oxide material with the molten carrier material; before or after said contacting step, converting metal oxide in said metal oxide material to a sulphide thereof; utilising the circulating molten carrier material to transmit heat generated at at least one exothermic site in the extraction circuit to at least one endothermic site in the circuit; and recovering said metal or sulphide thereof, said method being characterised in that a layer of protective molten material is maintained below said molten carrier material, said protective molten material being denser than said molten carrier material, being immiscible therewith, and being either stationary or being circulated at a slow rate relative to that at which the molten carrier material is circulated.

By providing a stationary or only slowly moving protective molten layer below the relatively fast moving layer of carrier material, erosion of the hearth or floor of the furnace or furnaces in which the method is carried out is reduced.

The depth of such a protective layer need only be sufficient to ensure that it is greater than the depth of the boundary zone in the protective layer at the interface between the layers, in which boundary zone there will inevitably be some movement as a result of contact with the fast circulating molten carrier layer. The depth of this boundary zone will depend upon the nature of the two layers and the rate of circulation of the molten carrier layer. However, it is envisaged that the layer of protective molten material will normally have a depth of 40 mm to 100 mm.

By providing such a protective molten layer over the hearth of the or each furnace, it is possible for a low-cost refractory lining to be used on the hearth and this further reduces the capital cost of the installation.

For low melting point protective materials (eg lead), it is preferred to provide for heating of the casing of the furnace in the region of the hearth to a temperature which exceeds the melting point of the protective molten material. By so heating the casing, it is ensured that penetration of the protective molten material into the refractory lining does not result in establishment of a freeze line which might result in spalling and related problems associated with a liquid solidifying within a ceramic structure.

This second aspect of the present invention is applicable to the smelting of metal oxide materials, such as deepsea manganese nodules for the purpose of recovering certain valuables therefrom, e.g. for the recovery of at least one of the group consisting of copper, nickel and cobalt. Currently, the recovery of manganese from deepsea manganese nodules is not commercially important and so manganese may be fluxed with silica and removed as manganiferous slag which is treated as a storable by-product. In such a process, it is preferred to use a copper nickel sulphide matte as the molten carrier material which is circulated and to add suitably size-reduced deepsea manganese nodules thereto. The deepsea nodules may be added in admixture with a suitable carbonaceous reductant (e.g. partially devolatilised coal), together with the optional inclusion of siliceous material (e.g. silica) and additional copper which may be in the form of a copper-bearing mineral such a chalcopyrite or scrap copper, for example from re-cyled impure copper cathodes from an electro-refining operation to be described later or from industrial copper scrap material. Depending upon the relative proportions of copper metal and sulphur in the feed, additional sulphur may also have to be added to the molten copper nickel sulphide. It is preferred to apply this aspect of the present invention to the joint smelting of deepsea nodules with chalcopyrite. It is particularly preferred for the copper content of the feed to be such as to ensure that phase separation of a nickel-copper or nickel-cobalt-copper alloy takes place whereby a permanent bottom layer of such alloy is maintained below the circulating sulphide carrier layer and is run off as product at a sufficient rate to maintain a protective layer of the required depth above the refractory lining.

Experiments were conducted to establish the feasibility of directly producing a relatively low iron alloy whilst at the same time in one step eliminating most of the manganese to a slag, which depending on economic circumstances, could be utilised in the future as the starting point for manganese or ferro alloy production. To simulate conditions likely to be experienced in a forced melt circulation type of process, pressed compacts of powdered synthetic sea nodules with various additives including silica, partly devolatilised coal (Rexco smokeless fuel) and chalcopyrite concentrate, were prepared. These compacts were immersed in metal-saturated copper nickel sulphide matte at about 1350° C. Conditions were chosen so that three liquid phases formed once the compacts were assimilated into the melt. Again in an attempt to simulate a melt circulation process, one of these three phases was purposely chosen to be present in a large excess and in this case the copper nickel matte was selected. In a practical situation the matte would be forced around a closed loop circuit to effect dissolution of the oxidic feed material whilst also being capable of sustaining a permanent bottom layer of nickel, cobalt copper alloy and providing a means for reception and transference of thermal energy from fossil fuel firing without the need of an electric furnace. The synthetic sea nodule (SSN) material was prepared with the following chemical analysis:

| Element: | Mn | Cu | Fe | Ni | Co | Na | SiO$_2$ | Al$_2$O$_3$ |
|---|---|---|---|---|---|---|---|---|
| Percent: | 34.3 | 1.28 | 5.49 | 1.80 | 0.22 | 3.55 | 13.0 | 5.7 |

From a consideration of published phase diagrams for the Cu-Ni-S system, a two-phase matte/metal separation requires that some additional copper has to be added to supplement that in the sea nodules. In practice this could be derived from recycled impure copper cathode ex the electro-refining step, from industrial copper scrap material or from an added copper bearing mineral such as chalcopyrite concentrate. From the viewpoint of elemental distribution between the slag, matte and metal phases it is only of secondary importance which of the above options is pursued provided that ultimately due attention is given to the chemical mass balance. Thus if copper metal is added some sulphur would also have to be added elsewhere in the circuit. For the present purpose the conjoint smelting of sea nodules with chalcopyrite would appear advantageous and accordingly in some of the tests the powder compacts consisted of SSN plus added chalcopyrite in the ratio SSN=100, chalcopyrite=20 parts by weight. Table II gives the initial compositions of the charge material in three typical experimental runs.

TABLE II

| | Mass of compacted charge material (g) | | | | |
|---|---|---|---|---|---|
| Run No. | SSN | Partly devolatilised coal | SiO$_2$ | Na$_2$HPO$_4$ | Chalcopyrite Flotation Concentrate |
| 5 | 25 | 1.25 | 3.67 | 0.39 | — |
| 6 | 50 | 2.5 | 7.34 | 0.78 | 10 |
| 7 | 50 | — | 7.34 | 0.78 | 10 |

The three phases produced on rapid cooling of the reaction products were sampled and analysed to give an insight into the chemical distributions likely to be achieved in a melt circulation process. The results for experimental runs 5, 6 and 7 are given in Table III. Two different slag analysis figures are reported. The higher levels of Cu, Ni and Co in the as received material reflect some degree of mechanical entrainment of matte in the slag layer whereas the residues from a standard bromine/methanol leach are more indicative of the true metals loss to the slag given adequate settling time at high temperature to disengage entrained matte droplets from the slag before its removal from the furnace.

The metal alloy produced directly in the converting section of the matte circulation loop is likely to contain more sulphur than acceptable for normal anode production. One convenient method for desulphurising Cu-Ni is to provide a hot metal forehearth into which the metal from the main circuit flows continuously and then desulphurise this metal in situ. Forehearth treatment again is based on an adaptation of the R-H concept in steel degassing. Rather than referring to this as vacuum desulphurisation, it is probably better to view the operation as a reduced pressure operation for Cu-Ni or nickel whereas atmospheric pressure oxidation is adequate for copper. If an R-H type vessel is employed some of the active gas can be introduced into the upleg, but in most cases it will be necessary to have the major oxygen supply direct to the melt either by top blowing or by submerged tuyeres or lances.

TABLE III

| | Simulated Smelting Tests on Deepsea Nodules | | | | | | | | |
|---|---|---|---|---|---|---|---|---|---|
| | % | | | | | | | | |
| Description | Cu | Fe | SiO$_2$ | Ni | Al | S | Co | P | Mn |
| SSN5 | | | | | | | | | |
| Matte | 68.2 | 0.78 | 0.2 | 11.14 | 0.03 | 19.9 | 0.037 | T~ | 0.99 |
| Metal | 62.2 | 0.69 | 0.2 | 23.1 | 0.03 | 10.2 | 0.052 | T~ | 0.05 |
| Slag (Br$_2$/MeOH residue) | 0.39 | 3.28 | | 0.09 | | | 0.015 | | 35.3 |
| Slag (as rec'd) | 0.88 | 3.36 | 40.6 | 0.15 | 2.29 | 0.34 | 0.018 | 0.354 | 37.6 |
| SSN6 | | | | | | | | | |
| Matte | 64.8 | 2.45 | 0.4 | 9.11 | 0.03 | 21.3 | 0.043 | T~ | 2.05 |
| Metal | 63.5 | 2.11 | 0.6 | 23.7 | 0.03 | 10.3 | 0.060 | T~ | 0.33 |
| Slag (Br$_2$/MeOH residue) | 0.22 | 4.14 | | 0.03 | | | 0.008 | | 34.1 |
| Slag (as rec'd) | 0.73 | 4.31 | 38.5 | 0.07 | 3.35 | 0.61 | 0.013 | 0.330 | 35.7 |
| SSN7 | | | | | | | | | |
| Matte | 68.3 | 1.70 | 0.2 | 9.30 | 0.03 | 20.7 | 0.0340 | T~ | 0.085 |
| Metal | 64.0 | 1.29 | 0.5 | 25.7 | 0.03 | 9.72 | 0.060 | T~ | 0.05 |
| Slag (Br$_2$/MeOH residue) | 0.59 | 5.99 | | 0.13 | | | 0.014 | | 31.1 |
| Slag (as rec'd) | 0.89 | 6.03 | 43.0 | 0.17 | 2.70 | 0.27 | 0.021 | 0.249 | 33.0 |

As one example, consider the in situ desulphurisation to around 1% S of a metal produced initially with the following composition:

| 30% Ni | 60% Cu | 10% S |
|---|---|---|

According to initial calculations, detailed below, the metal would need desulphurising at a total pressure of about 0.2 atm. (24 in Hg vacuum). At 1327° C. (1600K) and $P_{SO2}=0.06$ atm. with adequate melt agitation it should be possible to desulphurise down to 1% S without solid NiO being formed. The heat balance calculations suggested that a reasonable heat loss could be tolerated and the operation still be autogenous if the molar ratio of O2 to N2 is 1:2.5.

In accordance with said second aspect of the present invention, such alloy layer to be stationary or only slowly moving relative to the rate of circulation of the molten sulphide carrier material. In this method of smelting deepsea manganese nodules, the alloy which is recovered is suitable for anodic dissolution and electro-refining into separate nickel and copper cathodes along with high recovery of cobalt either as metal or as a chemical product in the form of a cobalt compound. Any scrap impure copper cathodes in such electro-refining step can be recycled for use as feedstock in the smelting process. If the coppernickel alloy contains more sulphur than is acceptable for normal anode production, then such alloy may be de-sulphurised whilst in the molten condition. For example, copper-nickel alloy from the main smelting circuit may flow continuously into a hot metal fore-hearth where it may be vacuum de-sulphurised by using an adaptation of the RH steel de-gassing principle. Thus, the molten alloy to be de-sulphurised is lifted through one leg into a vessel maintained at reduced pressure and allowed to pass out of the vessel through a second leg. De-sulphurisation occurs as a result of the reduced pressure within the vessel.

A block diagram of an arrangement for smelting deepsea manganese nodules is illustrated in FIG. 2, where the block labelled "SHAFT FURNACE PREHEATER/REDUCER" represents a unit which is similar to that to be described hereinafter in relation to the shaft furnace 10 forming part of the arrangement of FIGS. 3 to 5. The charge in this shaft furnace is assimilated into the circulating matte at a rate which is determined by the rate at which solids are caused to dissolve in the matte.

The second aspect of the present invention is also applicable to the smelting reduction of metal oxide ores such as iron oxide, as described previously. In the case of iron oxide, it is preferred for the protective molten layer to be a layer of a suitable molten dense metal such as lead. Molten lead is substantially immiscible with molten iron which is used as the molten carrier material. Additionally, the low melting point of lead and its relative inertness towards steel plate means that an expensive refractory hearth, essential for conventional iron and steel making, is substituted by a molten lead base on top of a low-cost insulating castable refractory or its equivalent. By maintaining the steel plate which forms the casing at the base of the furnace at a temperature slightly above the melting point of lead, the aforementioned risk of establishing a freeze line in the refractory lining is obviated.

In the case where lead is utilised as the protective molten layer, any lead which may become incorporated into the molten carrier layer can be relatively easily stripped therefrom using a vacuum lift pump of the RH type previously discussed. Such a vacuum lift pump may be used as the prime mover for forcibly circulating the molten carrier material. Passage of the molten carrier material through the vacuum lift pump enables any lead in such carrier material to be stripped therefrom by vacuum distillation. Because the circuit is a closed loop, the relative efficiencies of vacuum de-leading and the lead pick-up to the circulating carrier material in contact with the lead layer determines the steady-state relative saturation of the molten carrier material with respect to dissolved lead. Whilst it may be thought that there are adverse health and safety implications associated with the use of molten lead at elevated temperatures, it is believed that close attention to engineering design can reduce the problems to acceptable proportions. Some calculations in this respect are now given for an operating temperature of 1400° C. in which 2% carbon hot metal is in contact with liquid lead at the same temperature. The equilibrium solubility at 1550° C. according to Japanese workers is about 0.16 wt % (T. Sugiyama and S. Inigaki, Denki Seiko, 1963, Vol. 34, 469-75). A less comprehensive but more recent Russian paper indicates a slightly higher solubility of 0.22% Pb at 1550° C. (A.N. Morozov and Yu Ageev, Izvest. Akad.Nauk. SSSR Metals., 1971, Vol. 4, 111-114). The lead pick-up will be greatest immediately beneath the carbon dissolution region in which by design the liquid phase mass transfer coefficient will be higher than elsewhere in the circuit. For a 1000 tpd Fe production level around 400 tpd carbon will have to be dissolved in the circulating hot metal. The driving force for lead dissolution in hot metal is at a maximum when the bulk lead level is zero and equilibrium is established at the liquid/liquid interface. At 1400° C. the Japanese work indicates that saturation is about 0.08% Pb. The estimated interdiffusivities evaluated for so-called mean film conditions are $D_c = 1.37 \times 10^{-4}$ cm$^2$/S and $D_{pb} = 0.42 \times 10^{-4}$ cm$^2$/S. Since carbon saturation occurs at about 5% C. at 1400° C., the driving force for carbon dissolution is $(5-2)=3$ percent. Thus the lead pick-up in the carbon dissolution region is given by $$\dot{n}\ Pb = (400) \frac{(0.08)}{(3.0)} \frac{(0.42 \times 10^{-4})}{(1.37 \times 10^{-4})}\ tpd$$

$$= 3.3\ tpd$$

The same calculation based on the Russian solubility data gives n Pb=4.5 tpd.

The above figures refer only to the carbon dissolution area. Lead pick-up will also occur throughout the whole hearth region, but elsewhere the mass transfer intensity can be reduced by increasing the bath depth from say 0.1 m to 0.3 m which for a given melt circulation mass rate reduces the liquid phase mass transfer coefficient by approximately one third. For a complete smelting reduction circuit, the other hearth areas are typically around twice that involved in carbon dissolution and thus on average the total pick-up of lead into the circulating hot metal is about 6.5 tpd for a 1000 tpd ironmaking plant. At steady state this also means that 6.5 tpd of lead has to be distilled out of the hot metal in the RH vacuum vessel. Preliminary calculations indicate that the resulting steady state concentration of lead in the hot metal after emerging from the RH vessel will contain around 35 ppm lead whilst the inlet lead level to the RH vessel will be about 55 ppm. In present foundry practice it is not uncommon to have similar lead contents in arc furnace melts derived from scrap iron and steel so the consequences of having a molten lead pad for iron smelting reduction does not introduce a serious hazard. It should be appreciated that in subsequent steelmaking, residual lead is volatilised to a large extent and reports to the steelmaking fume. The liquid lead recovered from the RH system is of course merely reverted back to the furnace hearth to replenish that lost by dissolution. At 35 ppm lead in hot metal leaving the smelting reduction furnace, the total lead ultimately reporting to steelplant fume is about 35kg per day for 1000 tpd Fe production. Various steelplant fumes in current industrial practice contain sometimes in excess of 4 percent lead content so the industry already is faced with developing methods for safe disposal or utilisation of such materials and irrespective of the present proposals, iron and steelmaking plant nowadays have very efficient fume extraction systems for plant hygiene and out-of-plant environmental reasons. It would therefore appear that the benefits derived from substitution of expensive refractory hearths by a pad of molten lead insofar as this makes ironmaking via smelting reduction feasible, far outweigh possible adverse effects. It is also worth pointing out that various elements which are associated with iron and steelmaking do in fact decrease the solubility of lead. In this respect, it can be seen from published literature that chromium and silicon are effective in this regard. Both ferrosilicon and ferrochromium are amongst those ferro-alloys currently produced in electric arc furnaces so the concepts already discussed in relation to ironmaking can also advantageously be applied to ferro-alloy production.

The method according to the second aspect of the present invention is also applicable to the smelting of nickel oxide ores such as nickel laterites by a process which involves smelting a nickel oxide ore, if necessary in admixture with a low silica iron ore such as a limonitic ore if there is insufficient iron in the nickel oxide ore and/or if the laterite ore has a high silica content, by metallisation and reaction with sulphur to produce an iron-nickel sulphide which is circulated as the molten carrier material, and introducing carbon so as to produce a stable immiscible layer of a nickel iron (carbon) alloy under the circulating nickel iron sulphide carrier material. The addition of carbon is controlled so as to suppress the liquidus temperature of the iron-nickel alloy. By controlling addition of carbon to produce an iron-nickel-carbon alloy, it is possible to operate at temperatures in the region of 1200°–1300° C. with metal-saturated matte (sulphide) containing some 20–10% sulphur, respectively.

In order to maintain the ferronickel layer as a separate layer under the circulating molten sulphide layer, it is necessary to ensure that the carbon content thereof is maintained at the requisite level.

From published thermodynamic data on the liquidus surface and tie-lines in the Fe-Ni-S system at a matte temperature of 1300° C., matte containing 33% Ni; 57% Fe; 10% S co-exists at equilibrium with a solid alloy containing 35% Ni and 65% Fe. This solid alloy can be transformed into a liquid alloy by carbon addition and, again from published data, it is known that such a liquid phase will contain around 3 per cent carbon at saturation. If it is assumed that the relatively small carbon addition has not greatly affected density or the nickel and iron activities in the alloy, then it is reasonable to anticipate that a liquid ferronickel alloy containing around 34% Ni, 63% Fe and 3% C would co-exist with a lighter 33% nickel matte containing around 10 per cent sulphur at 1300° C.

The controlled addition and maintenance of the desired carbon content of the liquid ferronickel layer can be readily achieved using a further extension of the melt circulation concept by employing the RH vacuum lift principle to provide an effective means for inducing a minor circulation (very low liquid velocity and hence no erosion problem on the refractory hearth) in the bottom liquid phase (i.e. the protectiver molten material). With an RH unit operating on the bottom liquid phase (in this case, the molten ferronickel alloy) solid carbon can be added to the bottom liquid layer as required in the RH vacuum vessel and the whole liquid mass transported slowly around its own closed loop quite independently of the major circulation of the upper phase which in this case is nickel matte.

Besides providing a solution to the hearth erosion problem in nickel laterite smelting, independent forced circulation of the bottom liquid ferronickel phase makes available the facility for either ferronickel or nickel matte production depending entirely on market requirements. In some cases, initial ferronickel production may also be favoured for cash flow reasons prior to the establishment of capital intensive matte processing facilities capable of separating cobalt and nickel. When pursuing the ferronickel option, mass balance considerations dictate internal recycling of sulphur between the matte circuit and the charge preheater/calciner, a situation readily accomplished by top blowing the matte with air/$O_2$ and venting the $SO_2$ to the gas up-take in which fuel addition is made to give the desired Reduction Ratio (R) as discussed later. It is to be appreciated that the rationale behind this whole approach has been to operate at relatively low furnace temperatures by operating in the matte mode together with a blended charge of limonitic material and high silica laterite ore. Clearly, if the liquidus temperature of the fused ore slag is higher than say 1300° C., it may then be necessary to top up the thermal input to the slag by electrical or other means.

In the case of a very high silica laterite ore (around 60%), processing directly to ferronickel would probably necessitate a slag tapping temperature in excess of 1600° C. Problems have been reported with refractory linings under these rather severe conditions. With a blended charge of a limonitic material with a high silica laterite ore, a slag liquidus of around 1350° C. can be envisaged. A typical blended composite charge may, for example, analyse 1.97% Ni; 3.3% FeO; 32.6% $Fe_2O_3$; 36% $SiO_2$; 10% MgO; 3.5% $Al_2O_3$: Loss on ignition 10%. Before drying the ore is assumed to contain 30% free moisture.

The use of a blended composite ore charged to a matte circulation furnace of the type discussed above enables some very significant process advantages to accrue. Processing necessarily includes drying and calcining prior to reaction with sulphur. In this process the calcining step is preferably conducted in a shaft furnace. Briquetted or pelletised blended ore is pre-reduced in the shaft furnace using gaseous reductants generated externally. Fuel efficiency is obtained by introducing secondary combustion air above a set of primary tuyeres. The reducing gases rise countercurrently to the flow of solids and a proportion of the partially spent reducing gas is withdrawn at the furnace top and recirculated with a secondary air through upper secondary tuyeres. A considerable length of shaft of relatively low height may be needed to enable the required nickel production to be accommodated. Such a shaft may be located above the full length of one side of the matte circulation furnace. The solid charge is fully supported by the matte carrier material and will melt at a rate depending on the rate of matte circulation, its temperature and clearance between the bottom of the column of charge solids and the furnace hearth. This approach eliminates entirely the problem area of calcine removal and its transfer to a melting unit, currently acknowledged as a severe drawback in current shaft furnace practice.

A plant embodying the above concepts is illustrated in FIGS. 3 to 6 to which reference is now drawn. A composite ore of high silica nickel laterite and limonitic ores in briquette form is charged into the top of shaft furnace 10 which, in this embodiment, divides the charge into three separate columns (see FIG. 6). The charge rests on molten iron-nickel sulphide (iron-nickel matte) which circulates in a closed loop path to define a circulating molten carrier material 11. The molten carrier material 11 is maintained in circulation through melt circulation furnaces 13 and 14 by means of RH unit 15 acting as a pump. Unit 15 is provided at the opposite end of the furnaces 13 and 14 to a channel 16 which interconnects the furnaces 13 and 14. A separate RH vacuum unit 30 is provided which acts separately on protective bottom layer 17 of a ferronickel alloy containing a controlled amount of carbon. The protective layer 17 is circulated through the melt circulation furnaces 13 and 14 via channel 18 by the unit 30. The circulation rate of the bottom protective layer 17 is very much less than that of the matte carrier material 11. Ferronickel product is removed from the layer 17 at a rate corresponding to the rate of production thereof. Pulverised coal and sulphur are charged into the melt circulation furnace 14 via a gas uptake and cross-over assembly 20 (see FIG. 3) where they react with gas from the sub-stoichiometric combustion zone to increase the ratio of carbon monoxide to carbon dioxide from about 1:2 to about 4:1.

Figure 6:
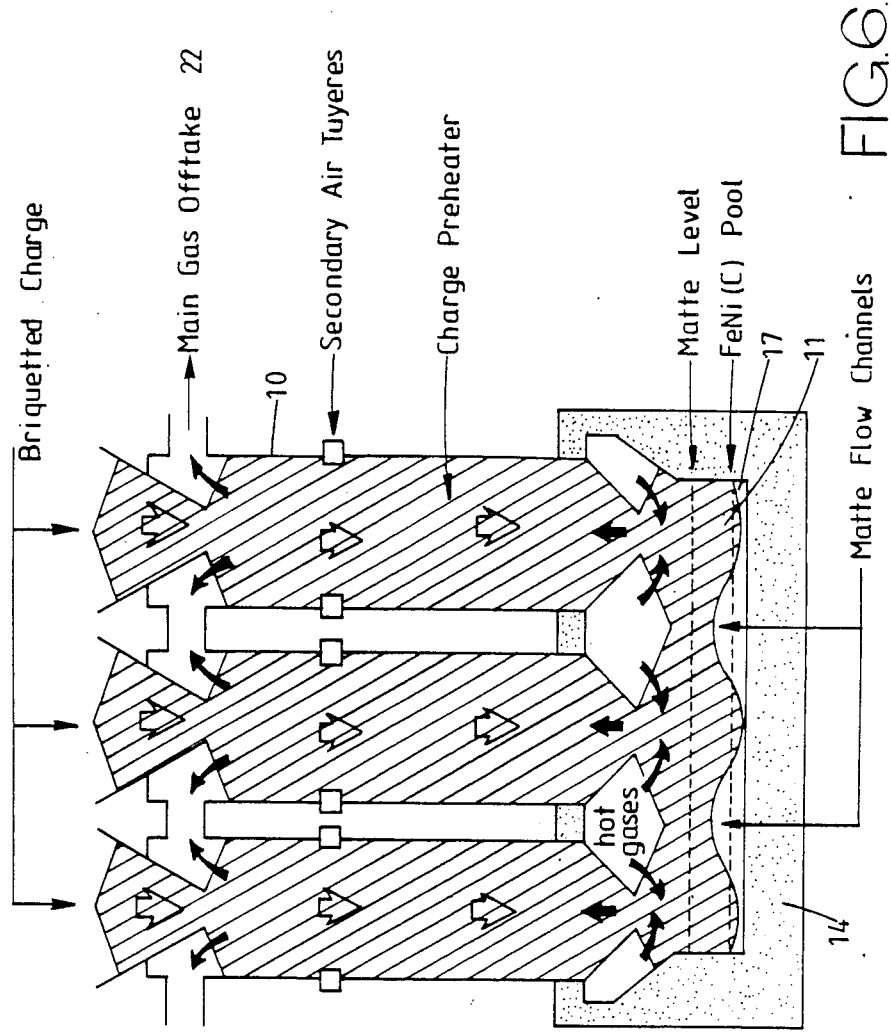

The resultant reducing gases vaporised sulphur pass in countercurrent fashion relative to the flow of matte carrier material 11 in the furnace 14 into the base of shaft furnace 10 (see FIG. 6). The composite ore which has been charged into the top of furnace 10 is pre-heated by the combustion of the coal volatiles. Reduction of nickel oxide to nickel by carbon monoxide which is present in the combustion gases takes place. The resultant nickel readily reacts with the sulphur vapour between the bottom of the furnace 10 and the layer 11 to form nickel sulphide. Likewise, the iron oxides, together with any minor amounts of iron which may have been formed in the furnace 10, also react with the sulphur vapour to form iron sulphide. These sulphides are scoured by the circulating matte layer 11 which actually supports the charge resident in furnace 10. The charge in the furnace 10 is associated into the matte layer 11 at a rate which is determined by the rate at which solids are caused to melt under the forced convection conditions resulting from circulation of the matte layer 11. Thus, control can be effected by controlling the matte circulation rate. Any oxide gangue forms slag on the surface of the matte layer 10 and is removed from the downstream end of furnace 14 at 21. Such slag is passed to a suitable heat recovery unit (not shown). The matte layer 11, below the slag is drawn through the RH unit 15 and into furnace 13 where it is heated from above by direct fuel combustion within the furnace 13. The clean matte surface enables efficient heat transfer from the combustion gases to the matte layer 11. From the furnace 13, the heated matte layer 13 overflows through channel 16 and back into furnace 14 to pass under shaft furnace 10.

The amount of carbon gasified in the system is controlled so as to ensure separation of the ferronickel layer 17 as a separate layer immiscible with the matte layer 11. If desired, additional carbon can be added to the ferronickel layer 17 using the RH unit 30. The combustion gases which have passed through the shaft furnace 10 are removed via a main gas off-take 22 (see FIG. 6).

To stay well within the bounds of established technology in the nickel industry, the length of the furnace hearth is fixed at 28 m long by 6 m wide. By comparison, the bath dimensions of the Kalgoorlie Nickel Smelter are reported to be 35 m long by 7 m wide. As a rough check on the smelting intensity that such a hearth can provide, standard procedures are applied. It is assumed that solid ore is melted down at a rate determined by the rate of heat transfer at the inter-face between the bulk melt and the bottom surface of the column of solid charge. Under turbulent forced convection conditions, the appropriate dimensionless correlation is $$Nu = 0.023\ Re^{0.8} Pr^{0.33} \qquad (1)$$

where
$Nu$ = Nusselt Number = $hd_e/k$
$Re$ = Reynolds Number = $dv_e\rho/\mu$
$Pr$ = Prandtl Number = $C_p\mu/k$
and
$C_P$ = specific heat of liquid
$d_e$ = flow channel equivalent diameter
$h$ = heat transfer coefficient
$k$ = thermal conductivity
$v$ = velocity
$\rho$ = density
$\mu$ = absolute viscosity For example, if the width of the hearth is taken as 6 m (up to around 10 m wide is current practice for a large reverberatory furnace) and the clearance beneath the charge is 0.5 m on average, matte circulation at a rate of say 1470 m$^3$/h gives an estimated value of the heat transfer coefficient of 1.94 kW/(m.$^2$K). The thermal requirements for melting are in the region of 20 MW so with a difference in temperature of say 100° C. between the slag solidus temperature and the bulk bath temperature, this translates into a bath area of about 104$_m{}^2$. For a more modest temperature driving force of say 75° C., a projected area of about 140 m$^2$ is required.

These figures are within the range of current reverberatory furnace practice and clearly on these grounds a single 28 m×6 m furnace would appear capable of sustaining a 50M lb/y Ni smelting operation.

Circulation of the molten carrier material may be effected in a similar way to that described previously i.e by using a vacuum vessel similar to that used in the RH vacuum degassing process for steel. Alternatively, a technique similar to that used in the Gas-lift Mixing Reactor Process (GMR) under development in Japan may be employed, wherein nitrogen is blown into molten pig iron from the bottom of a so-called lifting tube. This gas-lift principle can achieve melt circulation typically of around 82t/min. If necessary more than one GMR may be employed depending upon output requirements. The thermal requirements for melting are supplied by direct fuel combustion in the gas space above the melt return furnace which is in a side-by-side configuration with the furnace in which ore smelting takes place. The choice of pulverised coal, natural gas or fuel oil is dependent entirely on local economics. Combustion takes place in air preheated to around 1000° C. using heat recovered from slag by disintegration and dry granulation of slag in air. 1000N$_m{}^3$/h of air is required to recover 80% of the slag energy. Some 50–60% of this hot air is made available for fuel combustion above the matte carrier surface and the remainder contributes to the ore drying requirements. In this respect, nickel laterite ores may contain upwards of 25% free moisture in the as-mined state.

There may be a relatively minor amount of slag produced in the melting (i.e. oxidising) arm of the matte carrier circuit and, if coal is burnt, ash may be incorporated into a fayalitic slag and removed continuously as a thin layer floating on the bulk matte surface. Very few metal recovery processes permit direct energy transfer to a clean melt surface without impedance by accumulated slag, but matte carrier circulation makes this possible. Preliminary calculations indicate that a heat transfer intensity of around 280kW/m$^2$ is appropriate and that a bath area of about 130 m$^2$ is required. In a side-by-side configuration with the principal melting furnace say 28 m long, this fuel combustion furnace conveniently is also 28 m in length but its width is less than the other furnace, e.g. about 4 m.

The initial combustion of fuel above the melt bath is conducted with sub-stoichiometric air to give a $CO/CO_2$ ratio of about ½ but then, in a gas uptake rather similar to that in a Flash Smelter, the reducing potential of the combustion gases is adjusted by a further fuel addition to give the desired Reduction Ratio (R) defined as R=defined as $R=(CO+H_2)/(CO+H_2O)$ before being admitted to the base of the shaft preheater. The endothermic reactions involved in increasing R before the gases reach the preheater serve as the principal means for bringing the hot gas temperature down to around 1150° C. In this way sintering of the solid charge should be prevented and free movement of the charge column as it is assimilated into the circulating matte carrier should not be impaired. Elemental sulfur as required for matte formation is injected into the gas uptake as would additional fuel and air in accordance with thermal requirements.

Preliminary assessment of the energy requirements based entirely on fossil fuel and assuming non-availability hydro-electric power for producing nickel matte from the composite blend of high silica ore and sub-reserve limonitic material are summarised in Table IV.

The estimated 5GJ/tonne ore is significantly lower than energy requirements for other commercial operations capable of treating laterites of the type being considered. There are two principal reasons for this advantageous position. Firstly, direct fuel combustion is used to replace electric furnaces for charge melting. Secondly, it has been assumed that around 80% of the thermal energy in slag tapped from the melting furnace can be recovered into air preheated to 1300K. About 55% of this air is used in direct fuel combustion for charge melting and the remainder is available and is required for ore drying. No waste heat boilers are required in effecting this thermal economy.

TABLE IV

| Requirements for Treating Blended Composite Ore (per tonne dried ore) | |
|---|---|
| Electrical | |
| Blowers, Fans, etc. for slag energy recovery, primary and secondary air and gas recycle | 49 kWh |
| Briquetting Roll Presses | 6 kWh |
| RH vacuum pump (melt circulation) | 2 kWh |
| Refining and miscellaneous | 80 kWh |
| Total | 137 kWh (electrical) |
| Fuel equivalent of electric power (assuming 30% efficiency of conversion) | 1.48 GJ |

TABLE IV-continued

| Requirements for Treating Blended Composite Ore (per tonne dried ore) | |
|---|---|
| Fossil Fuel Requirements | |
| Drying, calcining and reduction/melting based on equivalent carbon requirements | 3.53 GJ |
| Total energy consumption | 5.01 GJ/tonne |

Also according to the present invention, there is provided a method of smelting a metal oxide material comprising the steps of converting at least one metal oxide in said metal oxide material to at least one metal sulphide; dispersing said at least one metal sulphide in a layer of said at least one metal sulphide at a dispersing station; forcibly circulating the metal sulphide in a closed loop path through said dispersing station and a heating station; and freeing the metal sulphide of slag before passing said metal sulphide to said heating station.

The use of a solid carbon reductant in ferronickel production with current technology makes it difficult to produce at good nickel recovery a crude carbon containing ferronickel with more than 22% Ni (i.e. a Ni/Fe ratio of about 0.28). In the forced circulation process going via the nickel matte route, a crude carbon containing ferronickel with a Ni/Fe ratio around 0.53 is obtained. This enhancement in nickel content significantly reduces the nickel losses in subsequent refining of the furnace alloy and is thus an added important advantage of the process route according to this aspect of the present invention.

In the processes described above which involve reaction of oxidic materials with a carbonaceous reductant, the oxidic materials are charged to the smelting furnace in an agglomerated condition, typically as pellets, briquettes or the like. Whilst prior agglomeration clearly gives direct process benefits in terms of improved thermal economy as a result of being able to use moving bed countercurrent contact between hot furnace gases and solid charge materials, the capital costs of charge preparation including perhaps drying, pelletisation, thermal induration/hardening can negate the benefits of charge agglomeration. The current widespread interest and commercialisation of plasma technology in metallurgical applications stems partly from the ability of plasma being able to accept ore fines or metallurgical fumes either directly or with minimal pretreatment. In the case of plasma processing, however, this ability to accept fines is a trade-off against overall thermal efficiency in that thermally generated electricity is inherently far less efficient than direct fuel utilisation. The above-described methods according to the present invention can be modified to enable both direct fuel utilisation and incorporation of fine charge materials without prior agglomeration, thus representing a considerable advance over current technology.

Depending on the nature of the oxidic fine material to be smelted and the availability and properties of the carbonaceous fuel, many possibilities are afforded.

Take, for example, the potentially largest single application of the proposed technology as directed towards the smelting reduction of iron ore fines with raw coal under environmentally acceptable conditions. In this case, molten carrier material circulation provides a means for supporting fine material and sintering it in situ whilst it is transported to the smelting reduction zone in which extensive gas evolution and melt ebullition occur. Without the in situ sintering or partial agglomeration, the fine ore would otherwise be blown out of the furnace to an unacceptable extent once the reduction reactions had fully developed. Thus, it is possible to lay individual layers of fine coal or coke and ore fines sequentially onto the moving molten metal surface to form a duplex floating layer with the coal/coke initially, precluding direct contact between the molten metal containing dissolved carbon and the overlying iron oxide. A solid iron reaction product forms in the region of the carbon/iron oxide interface and this then slows down further reduction and thus limits the amount of gas evolved in the charging region. However, as the coked layer dissolves in the molten metal, contact between the now pre-sintered iron ore and molten metal eventually occurs and smelting reduction then proceeds at a rapid rate. Delaying vigorous reaction until the fine ore is partially sintered is not possible in a continuous process employing a static bath of molten metal and is only made possible by the bulk movement away from the charging position which is afforded by forced melt circulation and the imposition of what is effectively a relatively inert "hearth layer" in conventional sintering terms. The arrangement just described also permits countercurrent gas/solid heat exchange to occur between gases derived from controlled air/oxygen addition to a proportion of the gases evolved in the smelting reduction zone as they are constrained to flow back over the layer of floating solids. Again it is the presence of melt circulation that permits continuous operation in a mode in which the carbonaceous fuel/reductant is screened to a large extent from direct reaction with oxidising gases by the overlying iron ore layer. Thus melt circulation and the associated bodily movement of solids floating on the melt permits firing and preheating of the solid charge from above in an analogous fashion to a travelling grate furnace or fuel combustor. To ensure that fines are not carried over excessively into the gas flowing above the rate of charge, the gas freeboard distance above the solids may be arranged so that local gas velocities are consistent with the propensity for solids entrainment. This means that in many cases the gas velocity has to be relatively low in the charging region with progressive increase permissible as the solids sinter or agglomerate partially, a condition achieved, for example, by profiling the cross-section of the furnace gas space.

Referring now to FIG. 7, there is shown a schematic arrangement for smelting reduction of iron ore fines using coal fines. Molten carrier material which, in this embodiment, comprises hot metal (i.e. the impure molten iron resulting from smelting reduction of the iron ore fines and which contains the usual inclusions such as carbon, sulphur, manganese etc.) is circulated through side-by-side furnaces 50 and 51 using an RH unit 52 to transfer hot metal from furnace 50 to 51, there being a channel 53 to return hot metal from furnace 51 to furnace 50. During its passage through furnace 51, the hot metal is heated by direct combustion of coal volatiles (produced as described below) with preheated air or oxygen and by combustion of carbon monoxide produced from the smelting reduction reaction. After heating, the hot metal passes through channel 53 into furnace 50. Coal fines are laid as a floating layer on top of the hot metal towards the left hand end of furnace 50 as viewed in FIG. 7. As a result of contact of the coal fines with the hot metal, the coal carbonises and agglomerates with accompanying emission of combustible volatiles. These volatiles are fed via passage 54 into furnace 51 where, together with supplementary fuel introduced via inlet 55, they are combusted with the pre-heated air to heat the hot metal as described above. Meanwhile, carbon is dissolved in the molten metal during its passage along furnace 50. At a location which is spaced somewhat downstream of the coal fines introduction station, iron ore fines are added on top of the floating layer of coal/coke. This serves to sinter the iron ore fines as previously described. Preheated air or oxygen is introduced into furnace 50 downstream of the iron ore fines introduction to support combustion of volatiles which are produced as a result of volatilisation of the coal in this region as well as a portion of CO released as a result of the smelting reduction. This serves additionally to preheat the charge which passes to smelting reduction zone 55 where vigorous reduction of iron oxide to iron takes place by reaction of the iron oxide with carbon derived from the coal. The conditions are so arranged that, in the smelting reduction zone, contact occurs between the pre-sintered iron ore and the molten metal so that the smelting reduction reaction proceeds at a rapid rate. Slag is removed from the right hand end of furnace 50. Hot metal product is withdrawn from the right hand end of furnace 51.

Although not illustrated in FIG. 7, a layer of lead is provided over the hearths of the furnaces 50 and 51 to reduce erosion of the hearths.

From the viewpoint of environmental acceptability of raw coal usage in the smelting reduction processes being discussed, it is very important that volatile matter generated during coal carbonisation is completely combusted in excess oxygen at high temperature to avoid gaseous emission of noxious materials such as tars and complex organic molecules normally regarded as serious pollutants. Under certain circumstances it may be preferable to devolatilise raw coal to form a coal char prior to its admission to the smelting reduction furnace and in this case the volatiles so released can be directed to the high temperature combustion arm of the melt circulation loop whilst the coal char and the ore fines are laid sequentially onto the melt surface as already discussed. Such an arrangement is illustrated in FIG. 8.

Referring now to FIG. 8, the plant illustrated therein is similar to that on FIG. 7 except that iron ore fines are introduced on top of carbonaceous material (coke breeze, devolatilised coal fines, char etc.) immediately downstream of the point at which the carbonaceous material was introduced. This is because there is no need to allow for the release of volatiles. If coke breeze or very low volatile coal (anthracite) is available then separate devolatilisation is not needed. In FIG. 8 there is, in effect, an in situ countercurrent solid/gas contactor for preheating the charge whilst cooling product gases and therefore from the viewpoint of thermal economy this is to be identified as a low energy option for smelting reduction.

Environmental acceptability of raw coal usage in the present context of smelting reduction of ore fines can also be achieved directly in the forced melt circulation system by trading-off the thermal benefits of partial heat recovery from combusted product gases as a proportion of them are cooled by direct contact with charge solids laid down on the circulating melt. It is therefore possible, instead, for all product gases to be vented off only after traversing the high temperature region with a view to subsequent heat recovery external to the main furnace enclosure. Such a scheme is shown in FIG. 8. Again, forced melt circulation can be seen to be providing unique features not available with current technology. Raw coal is devolatilised to a predetermined extent in situ within the furnace as a floating layer of solids prior to the addition of the overlying layer of fine ore material. In this way, gas evolution once the fine ore addition has been made is kept to a minimum whilst allowing sufficient time for adequate sintering or agglomeration to take place prior to the vigorous smelting reduction reactions being initiated at the time when the oxide material makes direct contact with the melt. The volatile matter released by this in situ carbonisation of the coal layer is swept away with the bulk gas stream into the region of the circuit in which combustion finally takes place at high temperature with an excess of oxygen (furnace 51).

In both FIG. 7 and FIG. 8, distribution of gas flow between furnaces 50 and 51 is shown to be controlled by a damper in a gas cross-over (passage 56) between adjacent furnace hearths. The actual arrangement and requirements for gas flow will vary depending on the particular situation and the configurations shown are indicative only.

In-plant fines produced via the arc-furnace route to steel are normally high in zinc oxide with lesser but still significant quantities of lead oxide contained therein. For example, a typical composition may be:

ZnO 16.7%; PbO 3.8%; $Fe_2O_3$ 54%; $Fe_{met}$ 1.8%; MnO 4.7%; C 1.2%; CaO 6.6%, MgO 2.4%; $SiO_2$ 3.9%; $Al_2O_3$ 0.7%; $Cr_2O_3$ 1.0%; $(Na_2O+K_2O)$ 1.5%

The non-ferrous metals content of fume derived from the Basic Oxygen Steelmaking (BOS) process is considerably less than arc furnace fume and total zinc contents of around 2% are more typical. However, taken together both fumes and other in-plant fines produced in both iron and steelmaking constitute a valuable source of both ferrous and non-ferrous metals. Only limited recycling of these in-plant fines is permissible so there has been for many years considerable world-wide effort directed towards their effective utilisation. In certain countries these materials are now being regarded as hazardous wastes and their safe disposal is becoming increasingly urgent. Here again plasma processes are being introduced but as stated earlier the use of thermally generated electricity leads to poor overall energy efficiency so there still exists a need for an effective method for treating these materials which directly utilises fossil fuel. Smelting reduction employing forced melt circulation would appear to offer substantial advantages over other methods either presently commercialised or in the realms of emerging technology.

Total reduction of steel plant fume to yield a liquid ferrous metal product along with metallic zinc and metallic lead within a single reactor system is entirely feasible using fossil fuel as reductant and energy source provided that the precepts of forced melt circulation are adopted. The requirements now can be summarised as follows:

(1) Solid input to be as received in-plant fines with minimal charge preparation. Perhaps some micro-pelletisation, nodulising and drying are acceptable.

(2) Minimal participation of carbon in the ZnO and PbO reduction to give initially Zn(g) and Pb(g) with minimal non-condensable gas so that condensation and $Zn_{(l)}$ and $Pb_{(l)}$ separation are simplified.

(3) High yield of ferrous units to liquid metal product and production of an inert discard slag.

(4) Raw coal probably as fines to be the principal energy source and reductant.

The rather stringent list of requirements listed above can be accommodated by a forced melt circulation reactor as illustrated in FIG. 9 and described as follows. Dried nodulised fume is charged from above onto the top surface of a circulating stream of liquid iron in furnace 60. The principal chemical reactions taking place are:

$ZnO + Fe \rightarrow FeO + Zn_{(g)}$
$PbO + Fe \rightarrow FeO + Pb_{(g)}$
$Fe_3O_4 Fe \rightarrow 4FeO$ The gases evolved, possibly along with some nitrogen as a carrier gas, are condensed directly to a liquid zinc/lead alloy which on cooling yields separate liquid layers of zinc and lead. A proportion of the lead product is introduced as a liquid to the furnace 60 (of a U-type hearth configuration with arms 61 and 62) to replenish that lost from the molten lead protective hearth layer as discussed previously in this document.

The circulating melt contains relatively little carbon so temperatures around 1530°–1550° C. are needed to prevent freezing. Without the protective liquid lead hearth layer, hearth erosion at these temperatures would be severe and indeed special precautions like enhanced cooling of the side and end walls will also be needed to protect the refractories from attack at these high temperatures by liquid ferrous oxide as it floats away from arm 61 into arm 62 of furnace 60.

In arm 62, raw crushed coal or coal fines are distributed onto the top surface of the molten oxide slag/layer. At the very high temperatures involved the rate of reduction of ferrous oxide to iron is extremely rapid and, as the floating mass progresses along arm 62, it is transformed into a low iron oxide slag. The ultimate thickness of this slag layer is of course a function of the gangue content of the waste oxide feed material and the melt circulation rate and furnace dimensions. Depending on particular requirements, these variables can be manipulated so that the thermal resistance of the slag layer is acceptable when considered from the view point of heat transfer to the melt from combustion of the CO released by the smelting reduction reaction above the melt surface. Some supplementary coal combustion will also be needed to augment the heat available from this CO combustion.

The residual slag along with molten iron overflows continuously from the furnace 60 into a separate vessel or tundish 63 in which slag is accumulated prior to ultimate disposal. The upleg 64 of the RH lift pump 65 is accommodated in this auxiliary vessel 63 whilst the downleg 66 discharges directly into the main furnace 60 at one end of arm 61 thus completing the closed loop melt circulation path.

As discussed previously, the RH lift pump 65 strips lead continuously from the circulating melt by vacuum distillation so that a steady state level of lead concentration is attained and by appropriate design the health hazards associated with the very small residual levels of lead in the molten iron circuit are reduced to acceptable proportions. In this connection and if it should prove to be necessary, the whole operation can be totally enclosed under a slight negative pressure with all effluent gases being cooled and ultimately passed to a bag-house to comply with stringent emission standards.

With a U-type furnace configuration, it is necessary to separate the oxidising gas in the combustion zone 67 from the lower oxygen potential region in which zinc gas is liberated. Some escape of CO from smelting reduction zone 68 back into furnace arm 61 is permissible but in the interests of ease of zinc and lead condensation some baffling of the gas space between both arms 61 and 62 of the furnace 60 would be desirable and probably a small bleed of inert gas to effect positive gas flow of zinc and lead vapour in the desired direction would be advantageous.

To test the validity of the chemical reactions involved in the contacting of steelplant fume with iron and to demonstrate the speed of these reactions at elevated temperature, a series of experiments were conducted using the technique of electromagnetic levitation to support and heat in an inert atmosphere a composite charge of a metallic iron tube within which compacted oxidic fume is contained. The fume samples were derived from both arc furnace and BOS operations. Each specimen consisted of a short length of tube tapped internally so that a preformed cylindirical compact of fume could be encased within the tube by screwed end plugs. The overall size of the assembled specimens were approx. 6 mm dia. by 7 mm long. The mass of fume corresponded to 2.5 to 3.5 percent of the total weight of the specimen and in this respect simulates the contacting of fume with a large excess of iron as indeed would be anticipated in the forced melt circulation process. It was not feasible with the equipment available to measure the temperature reached by the levitated samples but typically the solid specimens completely melted in around 10 seconds after being levitated. By switching the HF power off levitated specimens immediately fell out of the coil and were rapidly quenched. The fume or fused oxide material was separated from the iron and subjected to chemical analysis. The responses of typical arc furnace and BOS fumes in terms of zinc elimination as a function of time in the levitated state are given in Table V.

TABLE V

| | Zinc Elimination from Steelplant Fume in contact with Iron | | | |
|---|---|---|---|---|
| | Specimen | Time levitated (S) | Approx. Time Molten (S) | % Zinc Elimination |
| BOS fume | 39 | 10 | 0 | 59 |
| | 34 | 10 | 0 | 63 |
| | 35 | 20 | 10 | 89 |
| | 41 | 40 | 30 | 96 |
| Electric Arc fume | 42 | 10 | 0 | 75 |
| | 44 | 20 | 10 | 88 |
| | 45 | 25 | 15 | 90 |
| | 38 | 32 | 12 | 90 |
| | 37 | 40 | 20 | 95 |

I claim:

1. A method of smelting metal oxide material comprising the steps of forcibly circulating molten carrier material in a closed loop path serially through a smelting reduction zone, a slag separation zone and a heating zone; contacting the metal oxide material with the molten carrier material; introducing a carbonaceous reductant to the molten carrier material; at least partially reducing said metal oxide to metal by the carbonaceous reductant in said smelting reduction zone, the metal oxide and carbonaceous reductant being utilized in proportions such that the carbon from the carbonaceous reductant is converted to carbon monoxide; reacting the carbon monoxide with oxygen in the heating zone at the surface of the molten carrier material so that heat generated by the reaction is transferred to the molten carrier material; separating slag from said molten carrier material in said slag separation zone before the molten carrier material is circulated to the heating zone so that the surface of the molten carrier material which is circulated to the heating zone is substantially free of slag; and recovering said metal.

2. A method as claimed in claim 1, wherein the carbonaceous reductant is introduced into the circulating molten carrier material after leaving the smelting reduction zone but before entering the heating zone so that combustible gases generated as a result of heating of the reductant can be used to heat the molten metal in the oxidising zone.

3. A method as claimed in claim 2, wherein the metal oxide material is introduced in agglomerated form onto the surface of the molten carrier material in the smelting reduction zone.

4. A method as claimed in claim 1, wherein the carbonaceous material is introduced onto the surface of the molten carrier material as a layer upstream of the smelting reduction zone, and said metal oxide material in the form of fines is introduced onto said layer of carbonaceous material so as to be sintered before entering the smelting reduction zone.

5. A method as claimed in claim 4, wherein said carbonaceous material is coal fines which are heated by the carrier material and thereby agglomerated.

6. A method as claimed in claim 1, wherein the metal oxide material consists predominantly of iron oxide material and the molten carrier material consists predominantly of molten iron.

7. A method as claimed in claim 1, wherein a stationary or slowly moving layer of protective molten material is maintained below said circulating carrier layer, said protective molten layer being immiscible with and denser than said carrier layer.

8. A method as claimed in claim 7, wherein said protective molten material is molten lead, said molten carrier material consists predominantly of iron, and said metal oxide material consists predominantly of iron oxide.

9. A method of smelting a metal oxide material comprising the steps of forcibly circulating a molten carrier material through an extraction circuit; contacting said metal oxide with the molten carrier material; before or after said contacting stage, converting the metal oxide to metal or a sulphide thereof; utilising the circulating molten carrier material to transmit heat generated by at least one exothermic site in the extraction circuit to at least one endothermic site in the circuit; and recovering said metal or a sulphide thereof, said method being characterised in that a layer of protective molten material is maintained below said molten carrier material, said protective molten material being denser than said molten carrier material, being immiscible therewith, and being either stationary or being circulated at a slow rate relative to that at which the molten carrier material is circulated.

10. A method as claimed in claim 9, wherein said metal oxide material consists predominantly of iron oxide, said molten carrier material consists predominantly of iron, and said iron oxide is converted to iron by introduction of a carbonaceous reductant into said molten carrier material.

11. A method as claimed in claim 10, wherein said protective molten material is lead.

12. A method as claimed in claim 9, wherein said metal oxide material includes nickel oxide and iron oxide, said nickel oxide is converted to nickel sulphide, said molten carrier material consists predominantly of nickel matte, and said protective molten material is ferronickel containing a controlled amount of carbon.

13. A method as claimed in claim 12, wherein said metal oxide material is a high silica nickel laterite ore blended with a limonitic ore.

14. A method as claimed in claim 9, wherein said metal oxide material includes deepsea manganese nodules, at least one metal oxide selected from the group consisting of copper oxides, nickel oxides and cobalt oxides derived from said deepsea manganese nodules is converted to the sulphide thereof, said molten carrier material consists predominantly of copper-nickel sulphide, and said protective molten material consists predominantly of an alloy selected from the group consisting of copper-nickel based alloys and copper-nickel-cobalt based alloys.

15. A method as claimed in claim 9, wherein said deepsea manganese nodules and a copper-containing material are introduced into the molten carrier material in relative proportions such as to cause said alloy to form.

16. A method of smelting a metal oxide material comprising the steps of converting at least one metal oxide in said metal oxide material to at least one metal sulphide; dispersing said at least one metal sulphide in a layer of said at least one metal sulphide at a dispersing station; forcibly circulating the metal sulphide in a closed loop path through said dispersing station and a heating station; and freeing the metal sulphide of slag before passing said metal sulphide to said heating station.

17. A method as claimed in claim 16, wherein at least one metal oxide is reduced to metal before being sulphided.

18. A method as claimed in claim 17, wherein reduction is effected whilst the metal oxide is in a furnace which discharges directly onto the circulating metal sulphide layer so that the charge in the furnace is assimilated directly into the metal sulphide layer at a rate determined by the rate at which solids are caused to melt under forced convection conditions resulting from forced circulation of the metal sulphide layer.

19. A method as claimed in claim 16, wherein said metal oxide material is at least partially constituted by nickel laterite ore.

20. A method of smelting metal oxide material comprising the steps of forcibly circulating molten carrier material which consists predominantly of molten iron in a closed loop path through a feed zone, a reducing zone, a combustion zone and a slag separation zone; introducing metal oxide material which is at least one feed material selected from the group consisting of steel plant fume and other in-plant fines onto the surface of said molten carrier material in said feed zone so that (a) oxides of volatile non-ferrous metals in said at least one feed material are reduced by the iron of the carrier to said volatile non-ferrous metals and recovered, and (b) liquid ferrous oxide is produced and carried by said molten carrier material to said reducing zone; introducing carbonaceous reductant on top of said liquid ferrous oxide in said reducing zone so that the ferrous oxide is reduced to iron by carbon from the carbonaceous reductant whilst said carbon is oxidised to carbon monoxide; reacting said carbon monixide with oxygen in said heating zone so that the heat reaction is transferred to the melt which has passed from the reducing zone; separating slag from the molten carrier material before the latter is recirculated back from the slag separation zone to the feed zone; and recovering iron.

21. A method as claimed in claim 1, wherein the slag separating step includes removing said molten carrier material from under the slag and circulating the thus-removed molten carrier material to the heating zone.

22. A method as claimed in claim 21, wherein the forcible circulation of the molten carrier material is effected by pumping the molten carrier material from under the slag at one end of a lower hearth up to one end of an upper hearth in which the heating zone is provided, and by causing the molten carrier material to overflow at an opposite end of the upper hearth into an opposite end of the lower hearth, said smelting reducting zone being provided in one of said upper and lower hearths.

* * * * *